United States Patent [19]

Taguchi

[11] Patent Number: 4,650,407

[45] Date of Patent: Mar. 17, 1987

[54] COOLING AND GUIDING DEVICE FOR THERMOPLASTIC SYNTHETIC RESIN FILMS

[75] Inventor: Takeo Taguchi, Tokyo, Japan

[73] Assignee: Tomi Machinery Manufacturing Co., Ltd., Tsunashima-Higashi, Japan

[21] Appl. No.: 731,367

[22] Filed: May 7, 1985

[51] Int. Cl.$^4$ .................... B29C 35/16; B29C 47/90
[52] U.S. Cl. .................... 425/72 R; 264/569; 264/237; 425/326.1; 425/387.1
[58] Field of Search .............. 264/565, 566, 569, 169, 264/209.1, 237; 425/72 R, 326.1, 387.1

[56] References Cited

U.S. PATENT DOCUMENTS

| | | | |
|---|---|---|---|
| 3,244,786 | 4/1966 | Bild | 264/169 |
| 3,268,640 | 8/1966 | Gerber | 264/565 |
| 3,313,870 | 4/1967 | Yazawa | 264/565 |
| 3,321,563 | 5/1967 | Rettig et al. | 264/569 |
| 3,795,474 | 3/1974 | Heyer | 264/556 |
| 3,867,083 | 2/1975 | Herrington | 264/569 |
| 4,061,707 | 12/1977 | Nohtomi et al. | 264/566 |
| 4,115,048 | 9/1978 | Alderfer et al. | 264/569 |
| 4,174,932 | 11/1979 | Herrington | 264/569 |
| 4,408,970 | 10/1983 | Bustin et al. | 264/569 |
| 4,453,907 | 6/1984 | Taguchi | 425/72 R |

FOREIGN PATENT DOCUMENTS

| | | | |
|---|---|---|---|
| 672735 | 10/1963 | Canada | 264/569 |
| 621583 | 8/1978 | U.S.S.R. | 264/565 |

Primary Examiner—Jay H. Woo
Assistant Examiner—James C. Housel
Attorney, Agent, or Firm—C. O. Marshall, Jr.

[57] ABSTRACT

A cooling and guiding device for continuous tubular thermoplastic synthetic resin films comprises a support ring, and another ring which is vertically spaced from the support ring, one of the rings being rotatable relative to the other; each of a plurality of flexible conduits has one end connected to the support ring and its other end connected to the other ring, and each has a gas connection to a source of gas under pressure. The rings and conduits form an envelope the minimum diameter of which can be adjusted by relative rotation of the rings to accommodate a tubular film passing through the envelope; and each of the conduits has a series of orifices extending throughout the length of the conduit and arranged to direct gas jets against the exterior of such a tubular film to cool the film and to prevent the film from coming in contact with the envelope.

1 Claim, 11 Drawing Figures

COOLING AND GUIDING DEVICE FOR THERMOPLASTIC SYNTHETIC RESIN FILMS

BACKGROUND OF THE INVENTION

1. Field of the Invention

The present invention relates to a cooling and guiding device used for manufacture of thermoplastic synthetic resin films by the inflation method or the T-die method, and particularly to a cooling and guiding device by which a thermoplastic synthetic resin film is passed continuously through a compartment formed by a plurality of conduit members with holes through them. The film is cooled by a coolant jetted out of many holes in the conduit members and while the film is cooled it runs along a specified route with a specified distance maintained between the conduit members and the film.

2. Description of the Prior Art

In the manufacture of flat films and bags made of thermoplastic synthetic resins (sometimes containing a filler material) such as polyethylene, polypropylene, etc., both the inflation method and the T-die method have been adopted for forming said flat films.

Figure 1:
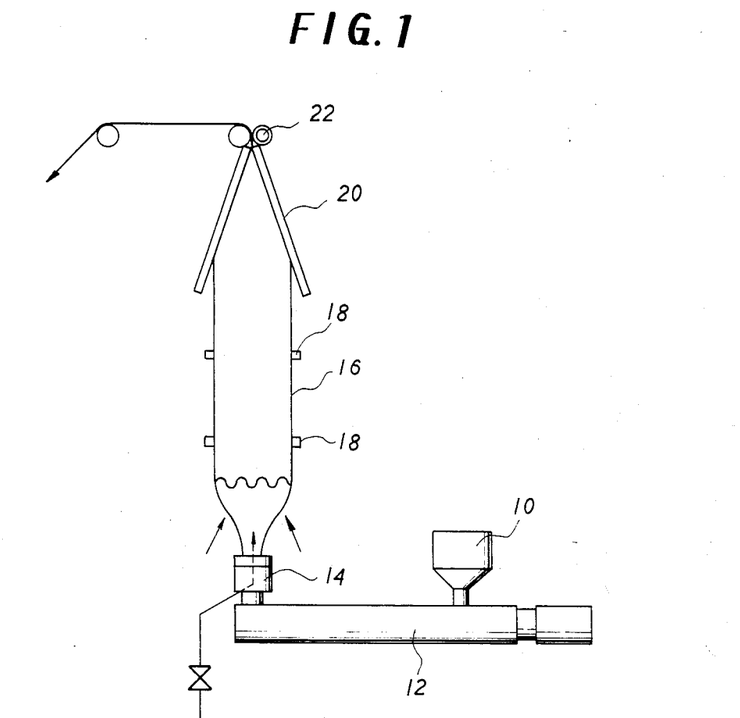
FIG. 1 is a schematic drawing to explain the manufacture of film by the inflation method.
Figure 2:
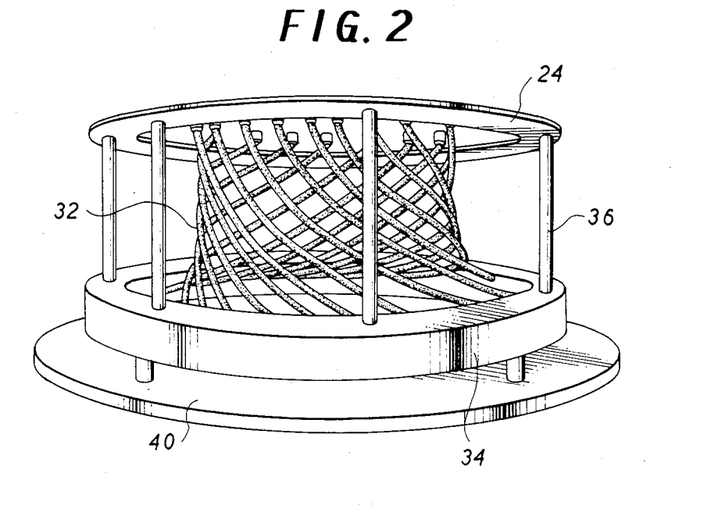
FIG. 2 is a perspective view of a cooling and guiding device as an embodiment of the invention.

First, an outline of the inflation method will be presented in reference to FIG. 1. Thermoplastic synthetic resin pellets charged into an extrusion forming machine 12 through a hopper 10 are melted by heating in the machine 12 and the molten resin is put into a die 14. In this die the resin is blown by compressed air to become a cylindrical film or a blown film 16 which is commonly called a bubble. The outside of the bubble 16 is cooled by a cooling and guiding device 18. As it is cooled, it is guided along a specified route. After this the bubble 16 is squeezed by a stabilizing plate 20 and a nip roller 22 to become flat and finally it is rolled up by a take-up device (not shown) as a flat film or a flat bag.

In the manifold die method that is a representative arrangement of the T-die method, a wide pooling section (manifold) positioned perpendicular to the incoming resin from an extrusion forming machine is provided at the point where the resin enters a die. The resin that has been made wider by the manifold is extruded from the outlet (lip) of the die which has a thin linear opening. In the almost same way as in the inflation method the resin goes through a cooling and guiding device to become a flat film.

The reasons for employing the cooling and guiding device in the inflation method and T-die method are firstly to increase the forming speed for high production efficiency and secondly to improve such characteristics as transparency and strength of films, and thirdly to meet the requirement in the manufacture of the product so as to roll it up uniformly.

In the U.S. Pat. No. 4,453,907 for the invention for a cooling and guiding device with the inventor of the present invention, a conventional cooling and guiding device is disclosed in which an enveloping ring is formed by a combination of many conduit members, and cooling water is passed through those conduit members to cool the film which is going through the enveloping ring while the film is guided on a specified route.

However, since, with the conventional art, the film is cooled and guided in contact with the device (conduit members), it cools non-uniformly, and the thickness of the film varies. Since the film travels at a considerable speed sometimes the film is marred by contact with the conduit members. Furthermore, it is not practical to increase the speed of forming the film because of its contact with the conduit members.

SUMMARY OF THE INVENTION

Accordingly an object of the invention is mainly to provide an improved cooling and guiding device.

Another object of the invention is to provide a cooling and guiding device in which there is no non-uniform cooling.

Still another object of the invention is to provide a cooling and guiding device which has no contact with the film.

A cooling and guiding device of the invention with the above mentioned objects is provided with a compartment constituted with a plurality of conduit members with holes through them, through which a thermoplastic synthetic resin film is continuously passed. Then the film is cooled by a coolant jetted out of many small holes pierced through the conduit members. When the film passes through the compartment, it is apart from the conduit members and it is guided along a specified route.

Other objects of the invention will be apparent from the description of the invention in reference to the attached drawings. However, the description below is only for explaining and illustrating an embodiment of the invention and the present invention will not be limited by it.

BRIEF DESCRIPTION OF DRAWINGS

FIG. 6 shows a small diameter enveloping ring;

DETAILED DESCRIPTION OF PREFERRED EMBODIMENT

As described above the cooling and guiding device according to the invention for thermoplastic synthetic resin films is provided with a compartment which is basically constituted with a plurality of conduit members with many holes through them and a thermoplastic synthetic resin film is continuously passed through the compartment. While it is going through it, the film is cooled by the coolant jetted out of many holes in the conduit members and at the same time it is kept away from the conduit members and guided along a specified route.

The explanation below will be exclusively centered on the aspect of a compartment that is constituted with conduit members with holes through them. As for the aspects of the conduit members and a coolant they are additionally touched upon in the description of embodiments of the invention, and those aspects are, of course, very important for the invention.

In a first embodiment of the invention which FIGS. from 2 to 6 show, a compartment is made by an envelope circle which many conduit members form. That is, the upper ends and lower ends of many curved conduit members are supported rotatably, so that a compartment made by an envelope circle formed at a fixed horizontal position by those conduit members can be deformed by rotating the upper and lower support members relatively.

Figure 4:
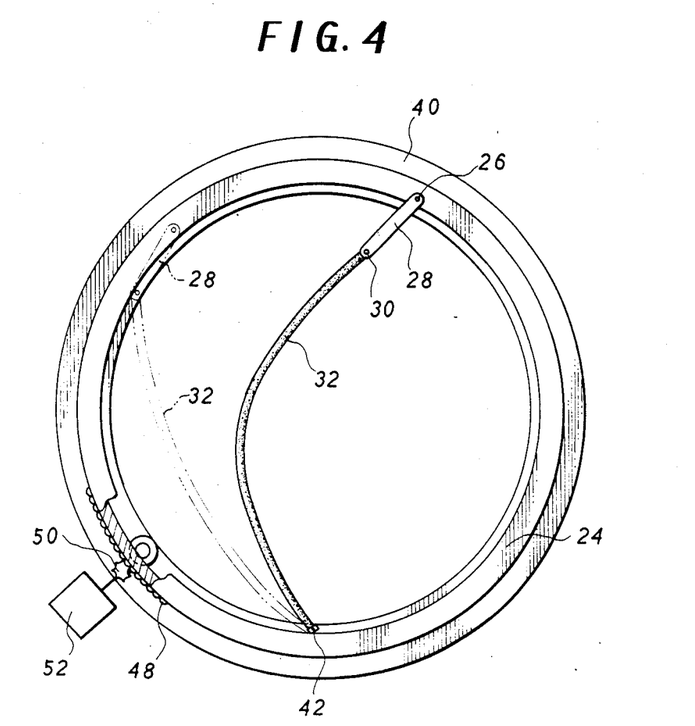
FIG. 4 is a partial plan view of the device of FIG. 2.

In the figures, 24 denotes an upper rotating ring. Said upper rotating ring 24 is an annular plate, preferably a circular annular plate. Pins 26 are provided at divisions that are equal divisions, for example, in 24 portions. One end of a link 28 is rotatably supported by each of those pins 26. The other end of the link 28 engages the upper end of the curved conduit member 32 through an upper joint 30 which is rotatable relative to said link 28. In other words the upper rotating ring 24 supports the upper ends of the conduit members 32 as shown in FIG. 4 through the link means consisting of the links 28, pins 26 and upper joints 30. In FIG. 4, therefore, the solid lines show the case when the conduit members 32 are twisted by the upper rotating ring 24 and its associated link means, and the dotted lines show the case in which the conduit members 32 are returned to the loose state.

A lower rotating ring 34 is provided, and it is connected as one body to said upper rotating ring 24 parallel to it and with a certain distance from it through a plurality (six for example) of upright columns 36. This lower rotating ring 34 is also annular as the upper rotating ring 24, and the bubble explained in reference to FIG. 1 passes through those rings. The lower rotating ring 34 has a groove 38 cut into its inner circumference.

Near the lower rotating ring 34 an annular lower support ring 40 is provided. The lower support ring 40 is also provided with many lower communication joints 42 (rotatable relative to the lower support ring 40 and communicating with a coolant supply device that will be described below). The lower ends of the curved conduit members 32 are connected to those lower communication joints 42. As shown in the plan view of FIG. 4 the position where the upper rotating ring 24 (actually the links 28) and the upper ends of the conduit members 32 are connected and the position where their lower ends and the lower support ring are connected are apart when they are seen in a plan view (their relation is similar to two points on the flow curve in a vortex).

At a plurality of positions on the lower support ring 40, upright members 44 are provided, and at the upper end of each of those upright members 44, a roller bearing 46 is provided. This roller bearing 46 engages the groove 38 that is cut into the inner circumference of said lower rotating ring 34. With this arrangement the lower rotating ring 34 that is one body with the upper rotating ring 24 can be rotated relative to the lower support ring 40. Other mechanisms for achieving the relative rotation between the lower rotating ring 34 and the lower support ring 40 can be conceived: for instance a mechanism which has the lower rotating ring mounted on the lower support ring 40 through a roller bearing.

Figure 3:
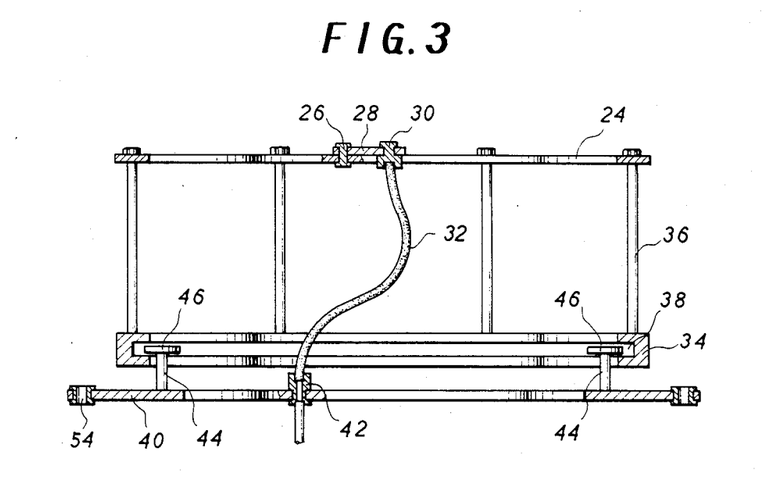
FIG. 3 is a partial cross-sectional view of the device of FIG. 2.

In FIG. 3 and FIG. 4 one of the conduit members 32 is shown as representing the whole. The conduit member 32 is a solid body tube formed with a certain curve in it (like the curve twisted along the flow curve of a vortex) and has numerous holes through it which are for jetting out the coolant that is brought to the inside of the conduit members 32. The materials that are used for those conduit members 32 are listed below and they are obtained relatively easily.

(1) Pipe made of a porous material
(2) Filter pipe formed by rounding a metallic net sheet in layers.
(3) Slit pipe which is formed from a solid pipe with holes or slits pierced through it
(4) Pipe made of a sintered metal The pipe bodies have a relatively large conduit channel for passing a coolant, and have numerous small holes through the pipe wall.

It is not necessary that those small holes cover the whole outside face of the pipe, because they are for jetting out a coolant towards a thermoplastic synthetic resin film. It is rather preferably for economic use of the coolant if the small holes are provided on the area which is directly related to the film to be cooled. Then small holes can be left only on the side of a conduit member facing the passage of a film and the small holes on the other area are covered by a silicon film or plugged by a tube which contracts when heated.

As explained above, the upper ends of the conduit members 32 are rotatably supported on the upper rotating ring 24 through the upper joints 30, links 28 and pins 26, and the lower ends of the conduit members 32 are supported by the lower support ring 40 through the lower joints 42 at a position that is off the position which is right below the upper joints. The position where the radius of curvature in the curved conduit members 32 varies most is approximately at the middle point between the upper rotating ring 24 and the lower rotating ring 34.

Figure 5:
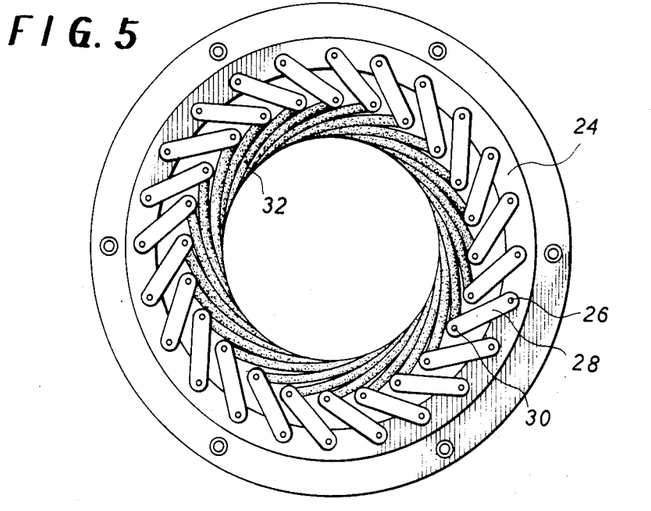
FIG. 5 and FIG. 6 are plan views of the cooling and guiding device shown in FIG. 2 as an embodiment of the invention and FIG. 5 shows the case of a large diameter enveloping ring.
Figure 6:
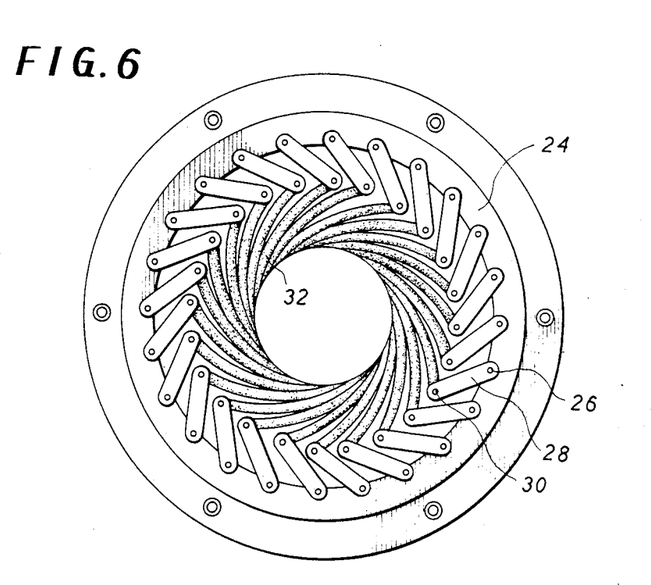

As shown in FIG. 5 and FIG. 6 an enveloping ring formed by the outer circumferences of the group of curved conduit members 32 is almost a true circle with respect to the center of the device, a bubble through the center of the device. Strictly speaking, the circle is a pseudo-circle composed of many straight lines. The diameter of the enveloping circle can be changed by rotating the upper rotating ring 24 relative to the lower support ring 40.

In order to bring about the above relative rotation, a rotating means described below is provided. As schematically shown in FIG. 4 a chain 48 is provided round the outer circumference of the lower rotating ring 34, and a sprocket 50 that meshes with the chain 48 is supported on the lower support ring 40. This sprocket 50 is driven clockwise or anticlockwise by a small motor 52 with a reduction device. The lower rotating ring 34, in one body with the upper rotating ring 24 as explained above, is rotated relative to the lower support ring 40 by means of the above mentioned rotating means. There are many means to effect rotation other than this: for example, a rack is formed on part of the outer circumference of the lower rotating ring 34 and a pinion is provided on the lower support ring 40, and this pinion is driven clockwise or anticlockwise manually or with a motor. As shown in FIG. 3 a plurality of collars 54 which have a screw thread inside are provided on the lower support ring 40. Those collars 54 are for lifting or lowering in the direction of travel of a bubble, the devices according to the invention which are stacked in multi-stages in the direction of travel of the bubble with a plurality of collars 54 connected to upright columns (not shown) that have a male thread, and by rotating the upright columns or the collars in order to set the devices at the most suitable cooling and guiding positions.

A coolant is conveyed to the conduit members 32 through a required piping and the lower communication joint 42. This coolant is finally jetted out of the small holes through the conduit members 32. The coolant can be a mixture of a gas such as air and a fluid such as water and it can also be atomized as an atomized mixture of air and water. In this embodiment the coolant is supplied from ends of conduit members 32 on one side. It can be also supplied to them from both ends to make the coolant meet in the tubes and then the coolant is jetted out. Such a coolant conveying and supplying device comprises, of course, a tank, blower, compressor and various pipes and valves.

Next, the effects of the above mentioned embodiment will be described. The lower rotating ring 34 engages the lower support ring 40 through the roller bearings 46 for relative rotation between them and the lower rotating ring 34 that is in one body with the upper rotating ring 24 can be rotated with respect to the center of the device by means of the above mentioned rotating means. During this rotation the position of connection of the upper rotating ring 24 that supports the upper end of a particular conduit member 32 through a link means and the position of the lower support ring 40 that rotatably supports the lower end of the particular conduit member, (in other words the positions of both upper and lower joints 30 and 42 projected on a plane) come nearer to each other or draw apart as shown in FIG. 4. By those movements the diameter of the enveloping ring formed at a certain position (nearly at the center between the upper and lower rotating rings 24 and 34) as shown in FIG. 5 and FIG. 6 by the outer circumferences of the conduit members 32 expands or shrinks. This enveloping ring is actually a pseudo-circle formed by many straight lines. As the number of conduit members 32 increases, the enveloping ring becomes more like a true circle. The diameter of the enveloping ring can be kept at a constant size by stopping the above mentioned motor 52.

At this time a bubble that passes through the enveloping circle at a certain distance from the circle is cooled by the coolant jetted out of the small holes in the conduit members 32 and at the same time the bubble is guided through the circle with its diameter maintained.

The above embodiment of the present invention allows the bubble to uniformly cool and keeps the wall of the bubble at a certain thickness so as to improve the quality of the bubble, because the coolant is jetted out from numerous small holes in the conduit members 32.

Further, because the bubble is cooled and guided without contact with the conduit members, it has no minute vibration while passing through the device and its quality is stable. Furthermore the speed of feeding the bubble can be markedly increased.

When a hole in a conduit member 32 is plugged, it can be unplugged by blowing compressed air through it. The daily maintenance of the device is simple.

Furthermore, the rate of cooling and the gap between bubble and the conduit members 32 can be adjusted by adjusting the pressure of the coolant.

Figure 7:
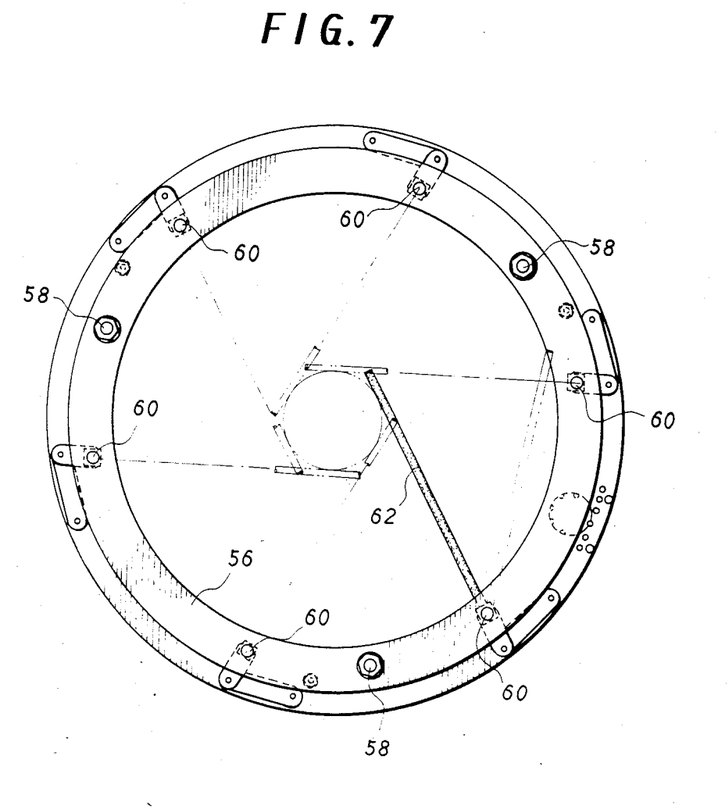
FIG. 7 is a plan view of a cooling and guiding device as another embodiment of the invention.
Figure 8:
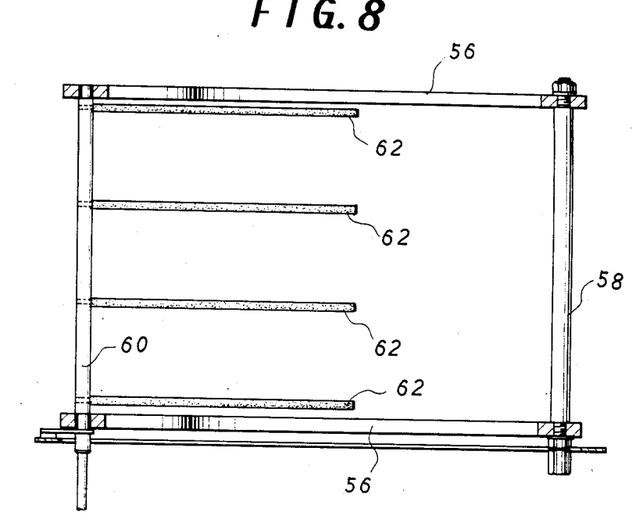
FIG. 8 is a side view of the device of FIG. 7.

A second embodiment of the invention is shown in FIG. 7 and FIG. 8. A compartment for cooling and guiding bubbles is formed by many conduit members with holes through them which are arranged in multistages at right angles to the direction of travel of the bubble.

In those figures a pair of ring members 56 are provided with members positioned vertically, and those members are connected by a connecting member to form one body. A pair of ring members have a plurality of supporting conduit members 60 installed vertically besides the connecting members 58. Those supporting conduit members 60 engage the ring members 56 rotatably, and the positions of arrangement of the conduit members 60 with respect to the ring members 56 are regularly at divisions that are, for example, six equal divisions of the ring member 56. The supporting conduit members 60 are hollow inside and guide the coolant from a coolant conveying device (not shown) to the conduit members 62. An annular body that is the basic frame of the device is constituted with the ring members 56 and the support conduit members 60.

One end of a conduit member 62 is fixed to a supporting conduit member 60 provided vertically in the same direction as the direction of travel of the bubble by means of joining with threads or by welding. Each support conduit member 60 has one or several conduit members 62. Those conduit members 62 are straight or curved at their tips and made of the same material as in the first embodiment and each has numerous holes. The conduit members 62 with holes through them which are connected perpendicularly to the support conduit members 60 which divide circumferentially the ring members 56 are located at levels in the vertical direction so that their ends will not hit one another and extend horizontally. With this arrangement the sides of the end portions of the conduit members 62 as a group form a compartment with respect to the annular bodies for cooling and guiding the bubble. The coolant jetted out of the numerous holes in the conduit members 62 cools and guides the bubble as in the foregoing embodiment. Specifically with this embodiment the portions from which the coolant should be discharged are limited, and the other portions are preferably provided with covering with a silicone film or with other means.

For changing the diameter of a compartment formed by a plurality of conduit members 62 for cooling and guiding, a plurality of supporting conduit members 60 must be rotated. However, those members 60 must not be rotated individually, or they will fail to form a compartment with an enveloping circle that should be made by the tips of the conduit members 62. A suitable link mechanism is, therefore, required in order to move the conduit members 62 horizontally and simultaneously with a uniform movement. Such a link mechanism can be conceived by an analogy with the first embodiment, but its details are outside of the main theme of the present invention. Its description will be, therefore, omitted.

The aspects of compartments formed by conduit members with holes through them can be other than those described in the foregoing two embodiments.

Figure 9:
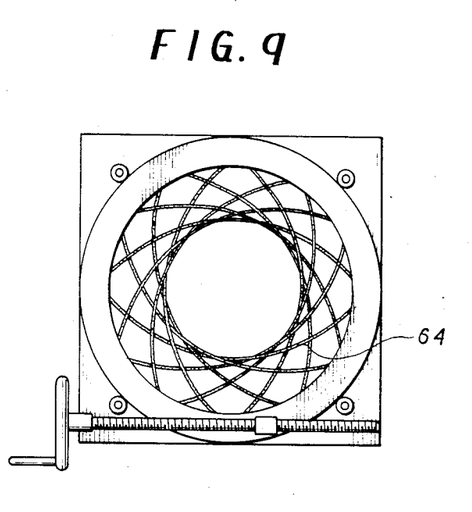
FIG. 9 is a plan view of a cooling and guiding device as still another embodiment of the invention.

The plan view of FIG. 9 shows a compartment constituted with many conduit members 64 with holes through them which are arranged on a horizontal plane perpendicular to the direction of travel of the film. The diameter of this enveloping circle can be changed just as the iris of a camera is changed.

Figure 10:
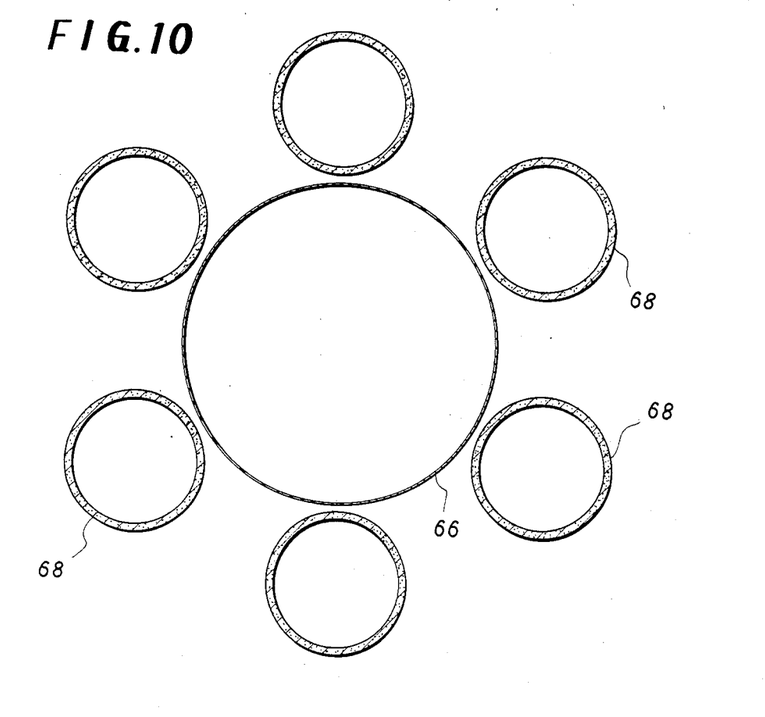
FIG. 10 is a schematic plan view of another embodiment of the invention.

In the plan view of FIG. 10 a fourth embodiment of the invention is shown. With this embodiment a compartment is formed by many conduit members 68 with holes through them. Those members are parallel to the direction of travel of the film 66 (in this case the direction is perpendicular to the surface of the drawing). The conduit members 68 are parallel one another and stand vertically at positions that are equal divisions of the circle. The diameter of the compartment can be changed when those conduit members 68 are moved as a whole towards or away from the center of the compartment in unison.

Figure 11:
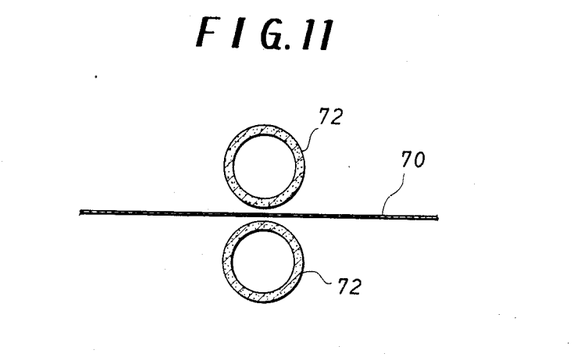
FIG. 11 is a schematic side view of another embodiment of the invention.

A fifth embodiment of the invention shown in FIG. 11 forms a compartment with a pair of conduit members 72 with holes through them with the film 70 in between. Such simple construction of a cooling and guiding device is capable of cooling and guiding the film by means of conduit members with holes through them, which is a main feature of the invention.

A compartment can be also formed by arranging conduit members with identical and uniform diameters in multiple stages in the direction of travel of the bubble. The figure of this arrangement is not shown.

What is claimed is:

1. A cooling and guding device for continuous tubular thermoplastic synthetic resin films, comprising a support ring, another ring which is vertically spaced from the support ring, one of said rings being rotatable relatvie to the other, a plurality of flexible conduits, each of which has one end connected to the support ring and another end connected to said other ring through link means, and each of which has a gas connection to a source of gas under pressure, said rings and conduits forming an envelope having an internal diameter, the internal diameter of said envelope being adjustable by relative rotation of said rings to accomodate a tubular film passing through the envelope, and each of said conduits having a series of orifices extending throughout the length of the conduit and arranged to direct gas jets against the exterior of such a tubular film to cool the film and to prevent the film from coming in contact with the envelope.

* * * * *